(12) United States Patent
Doll

(10) Patent No.: US 11,214,127 B2
(45) Date of Patent: Jan. 4, 2022

(54) AIR VENT WITH AN AERODYNAMIC ELEMENT FOR REGULATING AIRFLOW

(71) Applicant: Faurecia Innenraum Systeme GmbH, Hagenbach (DE)

(72) Inventor: Volker Doll, Ranschbach (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 63 days.

(21) Appl. No.: 16/784,901

(22) Filed: Feb. 7, 2020

(65) Prior Publication Data

US 2020/0254850 A1 Aug. 13, 2020

(30) Foreign Application Priority Data

Feb. 13, 2019 (DE) ...................... 10 2019 201 902.1

(51) Int. Cl.
*B60H 1/34* (2006.01)
(52) U.S. Cl.
CPC .................................. *B60H 1/3414* (2013.01)
(58) Field of Classification Search
CPC .......... B60H 1/3414; B60H 2001/3478; B60H 2001/3471; B60H 1/34; B60H 1/3421; B60H 1/345
USPC ........................................ 454/152, 154, 155
See application file for complete search history.

(56) References Cited

U.S. PATENT DOCUMENTS

2018/0056756 A1* 3/2018 Schaal ................. B60H 1/3414

FOREIGN PATENT DOCUMENTS

| DE | 102017113906 A1 | 8/2017 |
| DE | 102016116356 A1 | 3/2018 |
| DE | 102016116358 A1 | 3/2018 |
| DE | 102017011180 A1 | 6/2019 |
| EP | 3530505 A1 | 8/2019 |

OTHER PUBLICATIONS

"German Application Serial No. 10 2019 201 9021, Searcg Report dated Nov. 27, 2019", (Nov. 27, 2019), 9 pgs.

* cited by examiner

*Primary Examiner* — Jessica Yuen
(74) *Attorney, Agent, or Firm* — Schwegman Lundberg & Woessner, P.A

(57) ABSTRACT

An air vent comprising a housing extending between an air inlet opening and an air outlet opening, such that the housing has a first wall segment and a second wall segment; an air guiding element, arranged at least partially inside the housing thereby creating a first partial airflow channel and a second partial airflow channel between the air inlet opening and the air outlet opening; an airflow regulating element for regulating the airflow through the partial air flow channels, which airflow regulating element is arranged at the side of the air guiding element that is facing the air inlet opening; wherein the airflow regulating element forms an extension of the air guiding element in the direction of the air inlet opening and wherein the airflow regulating element is pivotable around an axis that lies behind the center of the airflow regulating element when viewed in the direction from the air outlet opening to the air inlet opening.

17 Claims, 6 Drawing Sheets

AIR VENT WITH AN AERODYNAMIC ELEMENT FOR REGULATING AIRFLOW

CLAIM FOR PRIORITY

This application claims the benefit of priority of German Application Serial No. 10 2019 201 902.1, filed Feb. 13, 2019, which is hereby incorporated by reference in its entirety.

TECHNICAL FIELD

This patent application relates to the field of an air vent. Specifically, the subject matter of this patent application relates to an air vent for a vehicle interior, which air vent has an airflow regulating element that allows the airflow to be directed in different directions by regulating the partial airflows in two channels of the air vent. The channels are created by an air guiding element and the housing of the air vent.

BACKGROUND

In some current air vents that use an air guiding element to create at least two channels for directing the vertical airflow, a flat flap is used to regulate the air flow in two channels. DE102016116356 A1 discloses such a mechanism for regulating airflow.

DE102016116358 A1 discloses an air regulating element or an air divider that is arranged inside the air guiding element, which air divider controls the quantity of air in two channels. The air regulating element is pivotable relative to the air guiding element around an axis that lies inside the air guiding element.

DE102017113906 discloses an air vent with an air regulating element which is a shell shaped as the surface of a cylindrical segment for closing two channels. The air regulating element is construed as an obstruction for an air flow into either one of the channels or into both channels.

A problem with some of the above disclosed approaches is that the air regulating element is not aerodynamic, i.e., when it is in the neutral or open position, where the neutral or open position is the position of the air regulating element in which the airflow in the two channels is the same, it does not appear as an extension of the air guiding element in the direction of the air inlet opening, and obstructs airflow. A further problem associated with devices shown in DE102017113906 is that the airflow regulating element has to pivot over a large angle between the neutral position in which the shell is in a lower position, and a position in which the shall is closing the upper channel. Since the airflow regulating element has to pivot over a large angle, this also necessitates a larger diameter of the air vent.

Another problem of known air vents in which the rotation axis of for example a flap is towards the air outlet side of the air guiding element, is that opening a closed channel requires that the flap has to pivot against the force exerted by the airflow.

SUMMARY

In an embodiment, the proposed air vent provides a housing between an air inlet opening and an air outlet opening, wherein the housing has two wall segments. The two wall segments may be an upper wall segment and a lower wall segment. The housing has an air guiding element arranged at least partially inside the housing. Preferably, the complete air guiding element or at least the largest part of the air guiding element is arranged inside the housing. The air guiding element and the housing create two channels, a first partial airflow channel and a second partial airflow for guiding a first partial airflow and a second partial airflow from the air inlet opening to the air outlet opening. The two partial air flow channels may be on either side of the air guiding element. Specifically, the first partial airflow channel is formed between the air guiding element and the first wall segment of the housing, and the second partial airflow channel is formed between the air guiding element and the second wall segment of the housing.

Furthermore, the air vent comprises an air regulating element for regulating the airflow through the two partial air channels, more in particular for regulating the ratio between the airflow through the first partial airflow channel and the airflow through the second partial airflow channel.

Also, the air regulating element is arranged at the inlet side of the air guiding element, i.e., at the side of the air guiding element that is facing the air inlet opening. The air regulating element forms an extension of the air guiding element preferably when the air regulating element is in a neutral position. Here neutral position refers to a position of the air regulating element in which both partial airflow channels are open for allowing a maximum partial airflow through both channels. In other words, the neutral position refers to a position in which the air regulating element has not moved for the purpose of restricting the airflow through any of the two channels.

This arrangement ensures that when the air regulating element does move for the purpose of restricting airflow through any of the two channels, it draws a narrow arc. An air regulating element that does not form an extension of the air guiding element would inevitably end up drawing a rather wide arc as it moves to restrict airflow through any of the two channels in the air vent. Given, the narrow arc of movement of the air regulating element, the height of the air vent can be minimized as the wide arc of movement does not need to be accommodated.

Further, the extension of the air regulating element is in the direction of the air inlet opening. Extension means that the air regulating element is shaped aerodynamically and arranged in the housing in such a way, that it does not or only slightly increase the flow resistance of the partial airflow channels and that it does not or only slightly deteriorate the air guiding properties of the air guiding element. In other words, the air regulating element and the air guiding element are streamlined, in particular when the airflow regulating element is in the neutral position. The air regulating element may be assembled with the air guiding element such that removing the air regulating element would result in poorer air flow characteristic of the air guiding element than in the case where the air regulating element is present. This means that the air regulating element may even improve the streamline of the air guiding element. This ensures that both in the neutral position and in a moved position of the air regulating element, the partial airflows observe a minimal additional flow resistance.

Furthermore, a second end portion of the air regulating element which is arranged on the air guiding element may be convex shaped while the corresponding end of the air guiding element may be concave shaped, or vice versa. This arrangement can reduce the overall length of the air vent, as the convex and the concave ends fit together compactly, thus saving space.

Also, the air regulating element is pivotable around an axis that lies behind the center of the air regulating element, when viewed along the horizontal direction from the air outlet opening to the air inlet opening. Here the center of the air regulating element is defined as the midpoint along the length of the air regulating element as it extends in a direction from the air outlet to the air inlet opening. The axis around which the air regulating element is pivotable, is preferably perpendicular to a horizontal viewing direction from the air outlet opening to the air inlet opening.

The fact that the axis of rotation lies behind the center of the air regulating element means that the air regulating element is pivotable such that the first end portion of the air regulating element, between the rotating axis and the end of the air regulating element near the air inlet opening, is rotating and not, or only slightly, displacing, whereas an second end portion of the air regulating element, between the rotating axis and the end of the air regulating element near the air outlet opening, may displace in order to regulate the air flow through the partial airflow channels. Such an arrangement is advantageous because it lends aerodynamicity to the air regulating element, also or in particular when the air regulating element is not in a neutral position. Specifically, with such an arrangement, with the rotating axis behind the center of the air regulating element when viewed in the direction from the air outlet opening to the air inlet opening, opening a closed channel requires less force since the air regulating element pivots along, rather than against, the direction of the force extended by the air flow. Thus, relatively less manual force, or alternatively a low power motor, may be used to pivot it. In the preferred embodiment where the two partial airflow channels are arranged above each other, the pivot axis lies in a horizontal plane in between both channels and is perpendicular to a vertical plane through the channels.

According to another embodiment of the air vent as mentioned above the airflow regulating element is tapered as it extends towards the air inlet opening, when viewed in the direction from the air outlet opening to the air inlet opening. The cross section of the tapered airflow regulating element perpendicular to the air flow direction increases in the air flow direction. Such a shape is advantageous from point of aerodynamics and allows streamlining with the air guiding element.

A further embodiment takes the form of the air vent of any of the preceding embodiments, where the first partial airflow channel and the second partial airflow channel are curved towards each other in a vertical plane at the air outlet opening such that an air outlet flow direction of the first channel and an air outlet flow direction of the second channel cross each other. This feature facilitates the change of airflow in upward and downward direction easily as described here in more detail. The outlet air flow from the first partial airflow channel and the outlet air flow from the second partial airflow channel collide after passing the air guiding element. The direction of the resulting air flow away from the air vent, for example into a vehicle interior, will be determined by the ratio of the two partial air flows which ratio in turn is determined by the position of the air regulating element. In a preferred embodiment, an upper partial airflow channel is formed by the first wall segment of the housing and an upper surface of the air guiding element, whereas a lower partial airflow channel is formed between the second wall segment and a lower surface of the air guiding element. An outlet airflow of the lower channel will be directed in an upward direction, whereas an outlet airflow of the upper channel will be directed in a downward direction. In case that both partial outlet flows are the same, the resulting airflow of the two colliding partial airflows is in a horizontal direction away from the air vent. In case that the lower channel is closed, the airflow away from the air vent is in the utmost lower direction, whereas in case that the upper channel is closed, the airflow away from the air vent is in the utmost upper direction. By partially closing one of the channels, the airflow can be directed in a vertical direction that is in between the utmost upper direction and the utmost lower direction, depending on the ratio of both partial airflows. Preferably, the air guiding body has a convex shape. It should be noted that the disclosed design is not limited to directing airflow in the vertical direction. By simply rotating the air vent, it may be used for directing air flow in the horizontal direction.

A further embodiment takes the form of an air vent of any of the air vents described above, wherein the air regulating element is wedge-shaped. For an air regulating element that is tapered towards the air inlet opening, this implies that the wide end of the wedge, towards the air guiding element, may be so formed so as to adapt to the shape of the air guiding element, or vice versa. For example, given an air regulating element with a wedge shape, having a curved wide second end part, the air guiding element may have a correspondingly curved shape at the part where the air regulating element is arranged on it. This arrangement can reduce the overall length of the air vent, as the two curved ends fit together compactly, thus saving space. On the other hand, for an air regulating element with a flat wide second end part, the air guiding element may have a corresponding flat part. It should be noted that the part of the air guiding element on which the air regulating element is arranged, does not necessarily need to correspond to the shape of the second end part of the air regulating element. Put simply, for an air regulating element with a flat wide second end part, the corresponding part of the air guiding element may have a curved shape.

A further embodiment takes the form of an air vent of any of the air vents described above wherein the air regulating element comprises a pivotable cylindrical segment. This cylindrical element preferably extends in a length direction perpendicular to the horizontal viewing direction from the air outlet opening to the air inlet opening. Preferably, such an air regulating element is configured such that the cylindrical segment forms the second end portion of the air regulating element. The cylinder axis of this cylindrical segment is the axis around which the airflow regulating element is pivotable. The cylindrical segment may be a shell forming the second end portion. Such a segment may be mechanically connected with an axle for pivoting around the axis, for example with spokes. The cylindrical segment may also be solid and comprising an axle for pivoting around the axis. The air regulating element may be shaped in the form of, for instance, a water-drop or a baseball bat.

A further embodiment takes the form of the air vent of any of the preceding embodiments, wherein the first partial air flow comprises at least one lamella to direct the first partial airflow in a horizontal direction. More in particular the airflow may be directed leftwards or rightwards, for example into a vehicle interior. Leftwards or rightwards means that the airflow has a leftward component or a rightward component, respectively. Usually the airflow will also have a horizontal component away from the air vent. In a preferred embodiment, each of the partial airflow channels comprises multiple lamellae arranged in parallel to each other. The lamellae in the first partial airflow channel and the lamellae in the second partial air flow channel may be mechanically connected with each other such that the lamellae move simultaneously. Furthermore, the lamellae of the first channel may be mechanically connected with the lamellae of the second channel, thereby simultaneously directing airflow from both channels leftwards or rightwards. Preferably, the lamellae are pivotable around a vertical axis.

A further embodiment takes the form of the air vent of any of the preceding embodiments, wherein the airflow regulating element is pivotable in the upward direction for directing net outlet airflow more upwards. The net outlet airflow is the airflow resulting after the collision of the upwards directed partial airflow and the downwards directed partial airflow. The net airflow is directed away from the air vent, for example into a vehicle interior. The net airflow can be directed more upwards by increasing the ratio between the upwards directed partial airflow and the downwards directed partial airflow. The net airflow can be directed more downwards by increasing the ratio between the downwards directed partial airflow and the upwards directed partial airflow. For example, the effective cross section of the partial airflow channel between the second wall segment of the housing and the air guiding element, the second channel, can be increased by pivoting the air regulating element upwards, starting from a position in which the air regulating element is closing the second partial airflow channel. Conversely, the effective cross section of the partial airflow channel between the air guiding element and the first wall segment of the housing, the first channel, can be decreased by pivoting the air regulating element upwards away from its neutral position.

Furthermore, the airflow regulating element is also pivotable in the downwards direction for directing a net outlet airflow more downwards. The net outlet airflow can be directed more downwards by increasing the ratio between the downwards directed partial airflow and the upwards directed partial airflow. For example, the effective cross section of the partial airflow channel between the air guiding element and the first wall segment of the housing, the first partial airflow channel, can be increased by pivoting the air regulating element downwards, starting from the position in which the air guiding element is closing the first channel towards its neutral position. Conversely, the effective cross section of the partial airflow channel between the air guiding element and the second wall, the second channel can be decreased by pivoting the air regulating element downwards towards away from its neutral position.

A further embodiment takes the form of the air vent of any of the preceding embodiments, wherein when the air regulating element is abutting the first wall segment of the housing, the first channel is closed, and when the air regulating element is abutting the second wall segment of the housing, the second channel is closed.

Further, in the neutral position, the airflow regulating element may be pivoted towards the air guiding element. Due to the pivot position of the airflow regulating element towards the air guiding element in the neutral position, direction of the airflow through the two partial airflow channels requires only slight pivoting movements of the airflow regulating element, thereby allowing fast regulation and improved control of the airflow. The airflow regulating element may also comprise a tapering section arranged between the axis and the side of the airflow regulating element that is facing the air outlet opening such that an area of a cross section of the airflow regulating element perpendicular to the airflow direction varies along the tapering section in the direction from the air outlet opening to the air inlet opening. The tapering section may improve the airflow characteristic of the airflow regulating element.

Also, in the neutral position, the tapering section may extend over at least 10 percent, in particular over at least 25 percent, particularly preferred over at least 50 percent of a length of the airflow regulating element between the axis and the side of the airflow regulating element that is facing the air outlet opening. The area of the cross section of the airflow regulating element may vary by at least 10 percent, in particular by at least 25 percent, particularly preferred by at least 50 percent along the tapering section in the direction from the air outlet opening 3 to the air inlet opening 2 in the neutral position.

Furthermore, in the neutral position, the tapering section may have two portions. A first portion may be arranged closer to the axis and a second portion may be arranged closer to the side of the airflow regulating element that is facing the air outlet opening the area. The cross section of the airflow regulating element perpendicular to the airflow direction may increase along the first portion of the tapering section and/or may decrease along the second portion of the tapering section in the direction from the air outlet opening to the air inlet opening. The increased cross section along the first portion may improve the airflow characteristic of the airflow regulating element and the decreased cross section along the second portion may allow the shape of the air guiding element to be fitted easily to the shape of the airflow regulating element, thereby saving space.

A further embodiment takes the form of an interior trim part, in particular a vehicle trim part that comprises an air vent according to one of the previous embodiments.

A further embodiment relates to a method, as it applies preferably to an air vent of any of the preceding embodiments, according to which an outlet airflow can be varied in different directions. This can be achieved by pivoting the air regulating element upwards or downwards and by moving the at least one lamella such that the outlet airflow is directed in a left or right direction.

The wording horizontal, vertical, left, right, upper and lower should not be interpreted as if the invention is limited to such a specific orientation. This wording is only used to indicate geometrical relationships between the parts of the air vent.

The disclosure may be more completely understood in consideration of the following description of various illustrative embodiments in connection with the accompanying drawings in which:

DETAILED DESCRIPTION

Figure 1:
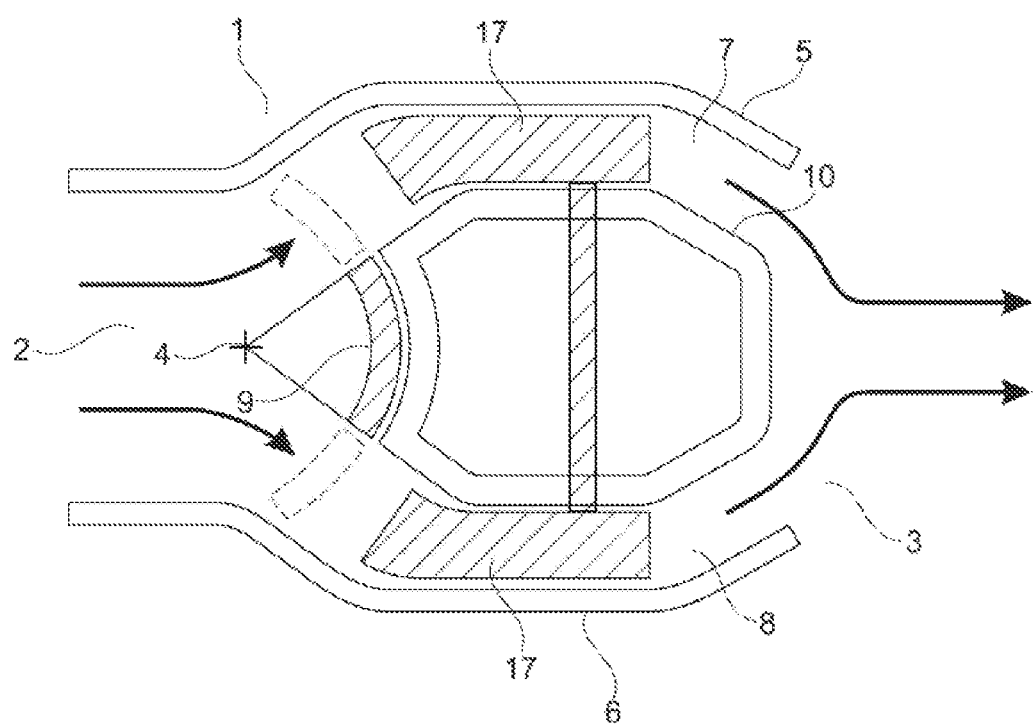
FIG. 1 illustrates a cross sectional view of an air vent with the air regulating element in a neutral position.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure. As one example, the air regulating element may be used to direct airflow in the horizontal direction, instead of the vertical. Furthermore, the figures of the presently proposed air vent shall not necessarily be limited to the drawn scale and may also be realized using other dimensions, in particular other relative dimensions.

FIG. 1 shows the internal view of the air vent 1. This figure shows a cross section of an air vent extending in a direction perpendicular to the plane of drawing. The air flow is from an air inlet opening 2 to an air outlet opening 3.

The air guiding element 10 between the first housing wall segment 5 and the second housing wall segment 6, forms two partial air flow channels, 7 and 8, respectively. Two housing side walls arranged perpendicular to the first and second housing wall section may close the housing at the left side and the right side when looking in the direction of the air flow.

An air guiding element is arranged inside the housing such that the housing and the air guiding element form an upper channel and a lower channel. The air guiding element has a convex shape such that the upper surface of the air guiding element and the first wall segment of the housing form a first channel that at the airflow outlet opening directs an outlet airflow in the downward. A second channel is formed by the lower surface of the air guiding element and the second wall segment of the housing. At the airflow outlet opening, the second channel directs the outlet airflow in an upward direction. A minor part of the air guiding element may extend outside the housing. As viewed from the air outlet 3 to the air inlet 2, an air regulating element 9 is arranged behind the air guiding element 10 and is shown here in a neutral position. The air regulating element 9 is pivotable around an axis by a hinge point or axle 4. In the neutral position, the airflow regulating element 9 is pivoted towards the air guiding element 10.

It can be seen that the air regulating element is tapered towards the air inlet. This arrangement and design effectively mean that the air regulating element serves as an extension of air guiding element in the neutral or open position, which is the position shown in FIG. 1. Furthermore, it also ensures that the air regulating element does not obstruct the air any more than the air guiding element would, in its absence. The end part of the air regulating element facing the air guiding element, comprises a shell for closing each of the channels. The shell is a section of a cylinder, and which shell is connected to the axle 4 by spokes or by side walls having the shape of a circle segment. In another embodiment, the air regulating element comprises upper and lower walls. These walls forming an extension of the air guiding element improve the streamline of the assembly of air regulating element and air guiding element. The upper and lower wall may, together with side walls and the shell, form a hollow body. The upper and lower wall of the air regulating element may, however, also be the surface of a solid cylinder segment. A solid cylinder segment is a segment of a solid rod. Alternatively, the air regulating element may be wedge-shaped.

In particular, the airflow regulating element 9 comprises a tapering section arranged between the axis and the side of the airflow regulating element 9 that is facing the air outlet opening 3 such that an area of a cross section of the airflow regulating element 9 perpendicular to the airflow direction varies along the tapering section in the direction from the air outlet opening 3 to the air inlet opening 2. The tapering section extends over at least ten percent of a length of the airflow regulating element 9 between the axis and the side of the airflow regulating element 9 that is facing the air outlet opening 3. The tapering section may also extend over at least 25 percent or over at least 50 percent of the length of the airflow regulating element 9. The area of the cross section of the airflow regulating element 9 varies by at least ten percent, but it may also vary by at least 25 percent or at least 50 percent. The tapering section has two portions, a first portion arranged closer to the axis and a second portion arranged closer to the side of the airflow regulating element 9 that is facing the air outlet opening the area. The cross section of the airflow regulating element 9 perpendicular to the airflow direction increases along the first portion of the tapering section and decreases along the second portion of the tapering section in the direction from the air outlet opening 3 to the air inlet opening 2. This arrangement allows an easy and space saving design of the airflow regulating element 9 and the air guiding element 10 and ensures proper pivot movements of the airflow regulating element 9 in order to open or close the partial airflow channels 7, 8.

The air regulating element is flush with the upper and lower surface of the air guiding element when the air regulating element is in its neutral position. The end part of the air regulating element facing the air guiding element is shaped such that it is in the shadow of the air guiding element when looking from the air outlet opening to the air inlet opening. Furthermore, the end part is shaped such that it allows closing each of the two channels. So, the end part can close the channels and nevertheless does not obstruct the air flow when the airflow regulating element is in its neutral position. It can be also be observed that the two partial air flow channels, 7 and 8, are curved towards each other in a vertical plane at the air outlet opening 3, such that the air outlet flow directions cross each other such that the two air flows collide with each other.

Pivotable lamellae 17 for directing the airflows to the right and to the left are arranged in both the upper channel and in the lower channel. Each of the channels comprises a set of parallel lamellae that pivot simultaneously around a vertical axis. In this embodiment, also the lamellae in the first channel and the lamellae in the second channel are pivotable simultaneously. For that purpose, at least one lamella in the upper channel and one lamellae in the lower channel are mechanically connected with each other, for example via an axle.

On the other hand, given the shape of the air guiding element, such as the one shown in FIG. 1, the air regulating element in fact increases the aerodynamicity of the air guiding element and leads to lesser obstruction of airflow, in the neutral position.

Figure 2:
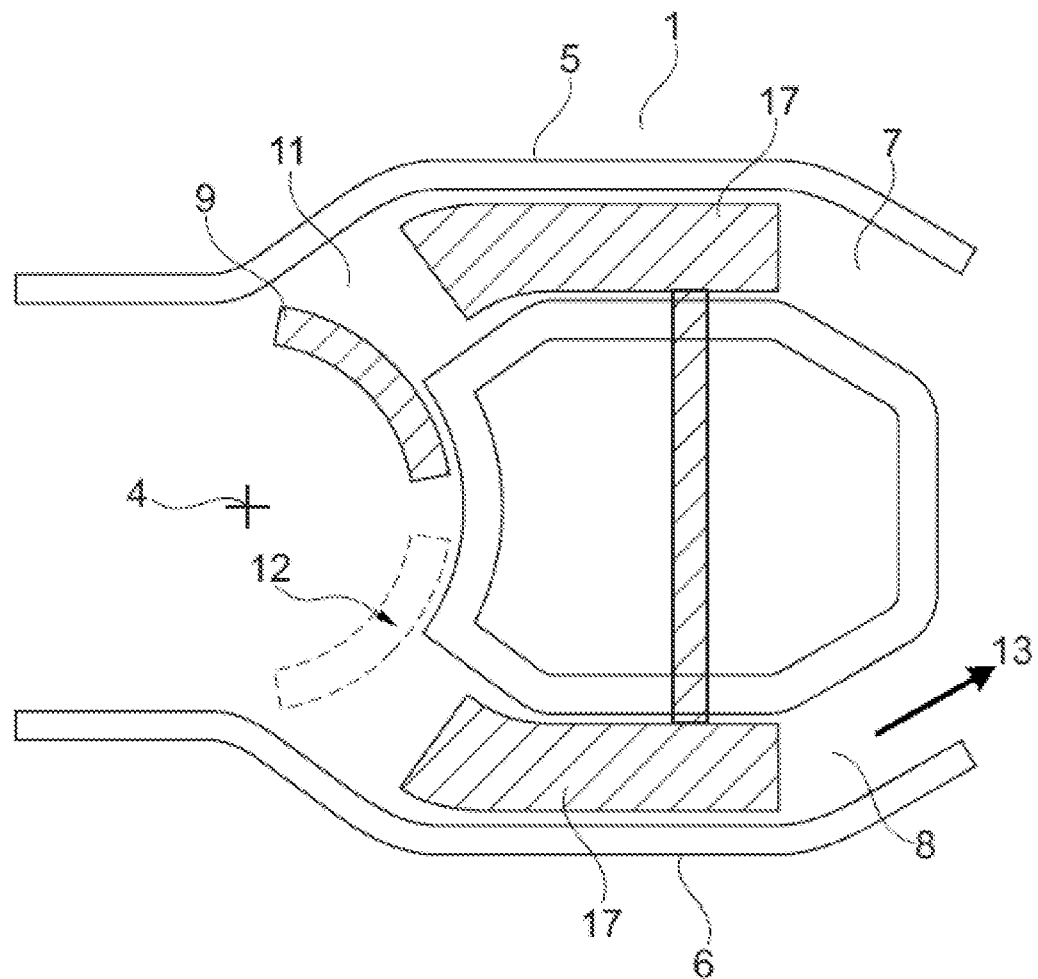
FIG. 2 illustrates a cross sectional view of an air vent with the air regulating element in an upwards position

FIG. 2 shows the air vent of FIG. 1 with the air regulating element 9 in an upwards direction 11, abutting the first housing wall segment 5, thereby allowing no air to pass through the first air channel 7. It can be seen that as the air flow to the first channel has been blocked by the air regulating element in its upper position, the second channel 8 receives the complete inlet airflow 13. Here the net outlet airflow is in the utmost upwards direction, which direction is determined by the shape of the second channel. Here only the shell for closing the channel is shown. However, the air guiding element may have one of the shapes as discussed above.

Figure 3:
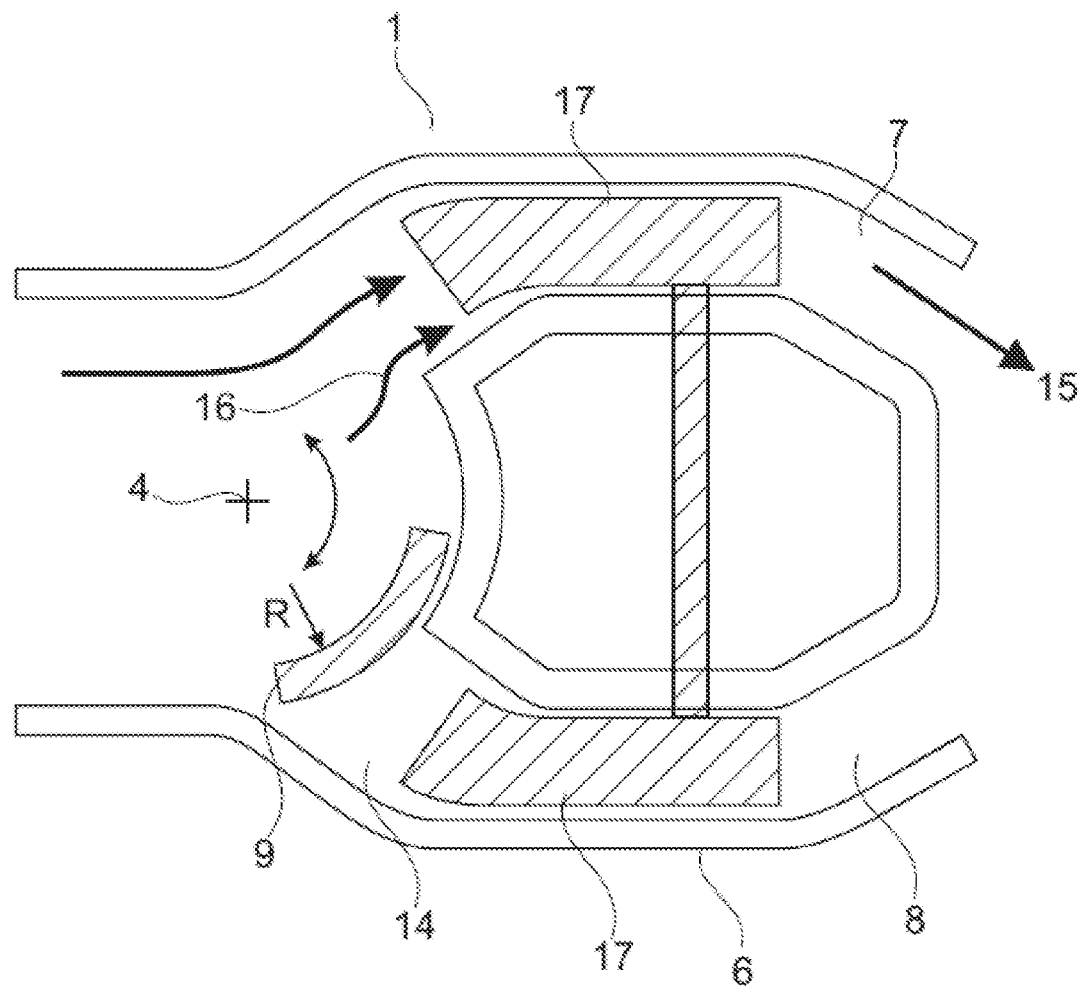
FIG. 3 illustrates a cross sectional view of an air vent with the air regulating element in the downwards position.

FIG. 3 shows the air vent of FIG. 1 with the air regulating element 9 in a downwards position 14, abutting the second housing wall segment 6, thereby allowing no air to pass through the second air channel 8. It can be seen that as the air flow to the second channel has been blocked by the air regulating element in its lower position, the first channel 7 receives the complete inlet airflow 15. Here the net outlet airflow is in the utmost downwards direction, which direction is determined by the shape of the first channel. Here only the shell for closing the channel is shown. However, the air guiding element may have one of the shapes as discussed above.

It will be appreciated that the airflow regulating element may be at any intermediate position between those described above. At such intermediate positions, the downwards or upwards directed airflow is in a direction that is between the utmost upper direction and the utmost lower direction. Therefore, by pivoting upwards and downwards, the air regulating element can direct more net airflow, upwards and downwards, respectively.

Figure 4:
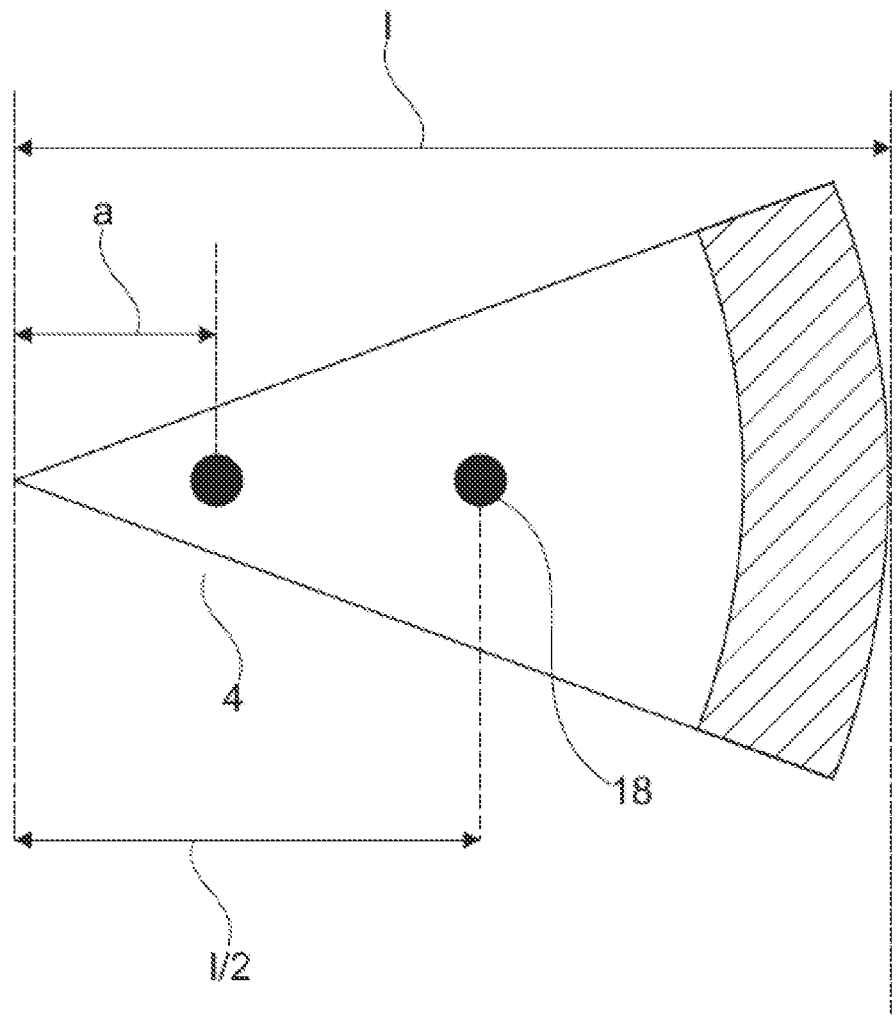
FIG. 4 illustrates a cross sectional view of an air regulating element with a displaced hinge point.

In FIG. 4, the hinge point 4 is farther along the length l of the air regulating element towards the air outlet opening 3, as compared to FIG. 1. It can be seen in FIG. 4 that the hinge point 4 is at a distance a from the end of the air regulating element. The hinge point 4 could be even farther along the length of the air regulating element at a distance $a^I$ (not shown in the figure) so that $a^I$ is greater than a. However, as stated above, the hinge point 4 should always be behind the center 18 of the air regulating element, when viewed along the horizontal direction from the air outlet opening to the air inlet opening.

Accordingly, $a^I$ can never be greater than half the length of the air regulating element. Precisely: $a^I \leq l/2$. This can be confirmed from FIG. 4. If at becomes larger than l/2, then the hinge point 4 would no longer be behind the center of the air regulating element. Thus $a^I \leq l/2$ ensures that the hinge point 4 is behind the midpoint of the air regulating element as it extends in a direction from the air outlet to the air inlet opening.

Figure 5:
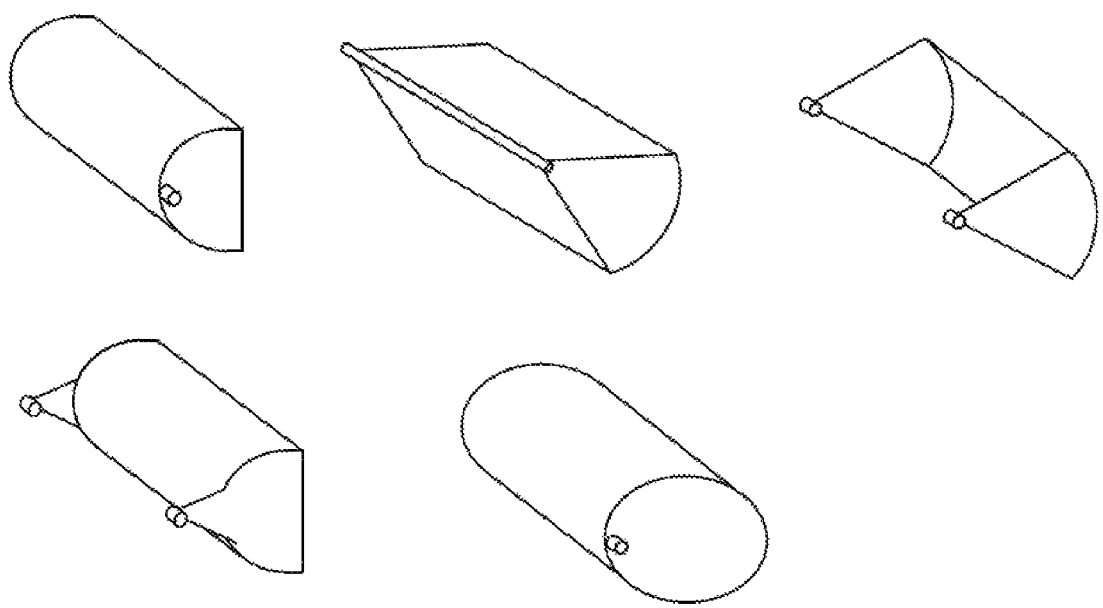
FIG. 5 illustrates some embodiments of the air regulating element.

In FIG. 5, some embodiments of the air regulating element are shown. These embodiments are arranged in the air vent such that the right hand side of the air guiding element faces the air guiding element 10, such that the air flow regulating element (9) forms an extension of the air guiding element. The air regulating elements have in common that they are pivotable around an axis that lies behind the center of the air regulating element when viewing from the air outlet opening in the direction of the air inlet opening and that they form an extension of the air guiding element. Furthermore, the shown air regulating elements have also in common that, in the neutral position, they may be pivoted towards the air guiding element 10 and that they may comprise a tapering section such that an area of a cross section of each of the airflow regulating elements perpendicular to the airflow direction may vary along the tapering section.

Figure 6A:
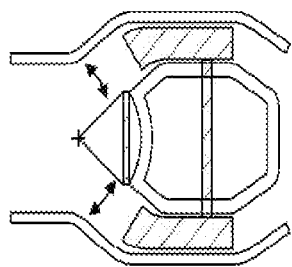
FIGS. 6a, 6b and 6c illustrate a cross sectional view of an air vent with the air regulating element in the neutral, upwards and downwards positions respectively, and where the second end part of the air regulating element is flat and wide.
Figure 6B:
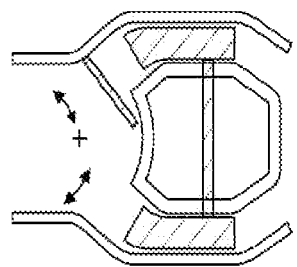
Figure 6C:
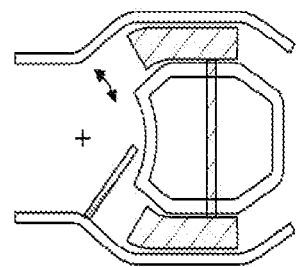

FIGS. 6a, 6b and 6c correspond to FIGS. 1, 2 and 3 respectively in that the air vents depicted in these figures are the same respectively, apart from the fact that in FIGS. 6a, 6b and 6c, the end of the air regulating element facing the air guiding element takes a flat shape.

Figure 7A:
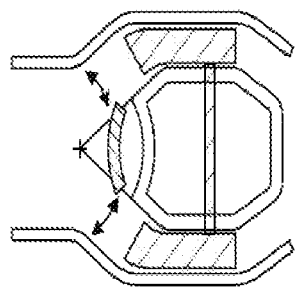
FIGS. 7a, 7b and 7c illustrate a cross sectional view of an air vent with the air regulating element in the neutral, upwards and downwards positions respectively, and where the second end part of the air regulating element is convex shaped.
Figure 7B:
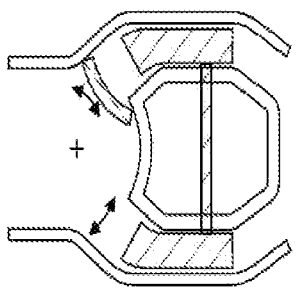
Figure 7C:
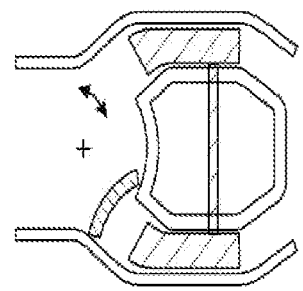

Similarly FIGS. 7a, 7b and 7c also correspond to FIGS. 1, 2 and 3 respectively with the difference that the end of the air regulating element facing the air guiding element, is convex shaped.

LIST OF REFERENCE NUMERALS

1. Air vent
2. Air inlet opening
3. Air outlet opening
4. Hinge point for air regulating element
5. First wall segment of the housing
6. Second wall segment of the housing
7. First partial airflow channel
8. Second partial airflow channel
9. Air regulating element
10. Air guiding element
11. Air regulating element pivoted upwards
12. Part of air flow deflected towards the second air channel
13. Total air flow in the second channel
14. Air regulating element pivoted downwards
15. Total air flow in the first channel
16. Part of air flow deflected towards the first air channel
17. Lamellae for directing partial airflow horizontally
18. Center of the air regulating element along its length

What is claimed is:

1. An air vent comprising:
   a housing extending between an air inlet opening and an air outlet opening, the housing including a first wall segment and a second wall segment;
   an air guiding element located at least partially inside the housing configured to create a first partial airflow channel and a second partial airflow channel between the air inlet opening and the air outlet opening;
   an airflow regulating element configured to regulate the airflow through the first partial air flow channel and the second partial airflow channel, the airflow regulating element being located at a side of the air guiding element that faces the air inlet opening;
   wherein the airflow regulating element is configured to form an extension of the air guiding element in the direction of the air inlet opening, the airflow regulating element being pivotable around an axis located behind the center of the airflow regulating element when viewed from the air outlet opening toward the air inlet opening, wherein in a neutral position in which both partial airflow channels are open, the airflow regulating element is pivoted towards the air guiding element.

2. The air vent of claim 1, wherein the airflow regulating element is tapered from a second end portion to a first end portion.

3. The air vent of claim 1 wherein the first partial airflow channel and the second partial airflow channel are curved towards each other in a vertical plane at the air outlet opening such that an air outlet flow direction of the first channel and an air outlet flow direction of the second channel cross each other.

4. The air vent of claim 1, wherein the airflow regulating element is wedge-shaped.

5. The air vent of claim 1, wherein the airflow regulating element comprises a cylindrical segment.

6. The air vent of claim 1 wherein the first partial airflow channel comprises a lamella to direct a partial airflow in a horizontal direction.

7. The air vent of claim 6, wherein the air guiding element is configured to direct an outlet airflow in a vehicle interior by pivoting the airflow regulating element upwards or downwards and moving the lamella such that the outlet airflow is directed leftwards or rightwards.

8. The air vent of claim 1, wherein the airflow regulating element is pivotable in an upward direction for directing a net airflow upward and wherein the airflow regulating element is pivotable in a downward direction for directing the net airflow downward.

9. The air vent of claim 1, wherein the first partial airflow channel is configured to be closed when the airflow regulating element is abutting the first wall segment, and wherein the second partial air flow channel is configured to be closed when the airflow regulating element is abutting the second wall segment.

10. The air vent of claim 1, wherein, in the neutral position, the airflow regulating element comprises a tapering section arranged between the axis and a side of the airflow regulating element that faces the air outlet opening such that an area of a cross section of the airflow regulating element perpendicular to a direction of the airflow varies along the tapering section from the air outlet opening toward the air inlet opening.

11. The air vent of claim 10, wherein, in the neutral position, the tapering section extends over at least 10 percent of a length of the airflow regulating element between the axis and the side of the airflow regulating element that faces the air outlet opening.

12. The air vent of claim 10, wherein, in the neutral position, the tapering section extends over at least 25 percent of a length of the airflow regulating element between the axis and the side of the airflow regulating element that faces the air outlet opening.

13. The air vent of claim 10, wherein, in the neutral position, the tapering section extends over at least 50 percent of a length of the airflow regulating element between the axis and the side of the airflow regulating element that faces the air outlet opening.

14. The air vent of claim 10, wherein, in the neutral position, the area of the cross section of the airflow regulating element varies by at least 10 percent along the tapering section in the direction from the air outlet opening to the air inlet opening.

15. The air vent of claim 10, wherein, in the neutral position, the area of the cross section of the airflow regulating element varies by at least 25 percent along the tapering section in the direction from the air outlet opening to the air inlet opening.

16. The air vent of claim 10, wherein, in the neutral position, the area of the cross section of the airflow regulating element varies by at least 50 percent along the tapering section in the direction from the air outlet opening to the air inlet opening.

17. The air vent of claim 10, wherein, in the neutral position, wherein the tapering section includes, a first portion located a first distance from the axis and a second portion located a second distance from the side of the airflow regulating element that faces the air outlet opening, wherein the cross section of the airflow regulating element perpendicular to the direction of the airflow increases along the first portion of the tapering section and decreases along the second portion of the tapering section from the air outlet opening toward the air inlet opening.

* * * * *